United States Patent
Smith et al.

[11] Patent Number: 5,889,864
[45] Date of Patent: *Mar. 30, 1999

[54] DATA TRANSMISSION SYSTEMS

[75] Inventors: Gregory J Smith; Colin J Helliwell, both of Lincoln, United Kingdom

[73] Assignee: Plessey Semiconductors Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 682,991

[22] Filed: Jul. 16, 1996

[30] Foreign Application Priority Data

Aug. 1, 1995 [GB] United Kingdom ............... 9515741

[51] Int. Cl.$^6$ ................................................ H04L 9/00
[52] U.S. Cl. ..................... 380/25; 380/2; 380/49; 380/59; 375/224; 370/241; 370/242; 371/20.1; 371/20.4; 371/48; 371/53; 371/67.1
[58] Field of Search ................................ 380/23, 25, 2, 380/9, 21, 49, 50, 59; 375/224–233; 370/2, 6, 241, 242, 245, 248, 249, 252, 253; 371/20.1, 20.3, 20.4, 20.5, 22.1, 48, 53, 67.1, 69.1, 70, 71

[56] References Cited

U.S. PATENT DOCUMENTS

| | | |
|---|---|---|
| 4,168,400 | 9/1979 | de Couasnon et al. ............ 179/15 |
| 4,885,777 | 12/1989 | Takaragi et al. ............ 380/30 |
| 4,908,828 | 3/1990 | Tikalsky .................... 371/69.1 |
| 5,208,858 | 5/1993 | Vollert et al. ............ 380/43 |
| 5,343,527 | 8/1994 | Moore ...................... 380/4 |
| 5,465,299 | 11/1995 | Matsumoto et al. .......... 380/23 |
| 5,613,002 | 3/1997 | Kephart et al. ............ 380/4 |

FOREIGN PATENT DOCUMENTS

| | | |
|---|---|---|
| 0 255 767 | 2/1988 | European Pat. Off. . |
| 0 331 205 A2 | 9/1989 | European Pat. Off. . |
| WO 88/09015 | 11/1988 | WIPO . |
| WO 94/00937 | 1/1994 | WIPO . |
| WO 94/07335 | 3/1994 | WIPO . |
| WO 94/14265 | 6/1994 | WIPO . |

OTHER PUBLICATIONS

Data Communications, *Computer Networks and Open Systems,* Fred Halshall, Pub. 1992, pp. 379–396.

*Primary Examiner*—Bernarr E. Gregory
*Attorney, Agent, or Firm*—Kirschstein et al.

[57] ABSTRACT

In a data transmission system in which a cyclic redundancy checksum value is derived in respect of each block of data bit values to be transmitted over the system, the checksum value in respect of blocks of data bit values intended for preselected ones only of the stations of the system is preloaded with a predetermined or netkey value to be used by the preselected stations such that only those stations can correctly decode the signals intended for them.

6 Claims, 1 Drawing Sheet

DATA TRANSMISSION SYSTEMS

BACKGROUND OF THE INVENTION

The present invention relates to data transmission systems including a plurality of transmitter/receiver stations, and in particular although not exclusively to such systems in which data signals from any one station are transmitted over a medium common to all stations, the medium being either wired or wireless.

In such systems it is important that the data signals are received at the correct destination and without corruption. At the same time it is often desirable that the data signals are receivable only at selected stations of a system, either to enable the operation of groups of stations within the system as separate networks or, by restricting reception to selected stations within a group, to reduce unnecessary workload on receiver processors which are not required to receive particular data signals. For example, respective groups of stations in adjacent factories may be required to operate as separate networks while utilising a common radio frequency channel, where the area coverages of radio signals being transmitted within the groups may overlap.

One method of checking whether data signals have been received correctly is to use a cyclic redundancy checksum (CRC), where the data to be transmitted is divided into convenient packets or groups of packets, each packet or group being subjected to a mathematical operation known to both the transmitter and the intended receiver of the data so as to arrive at a convenient digital checksum value that is transmitted with the packet or group. A receiver performs the identical mathematical operation on the received data and compares the resultant digital value with that transmitted with the packet or group. If the two checksum values are identical, the receiver knows to a high degree of probability that the data packet or group has been received correctly. If there is any difference, that data packet or group may be arranged to be retransmitted, for example by the absence on the transmission medium of any acknowledgment of correct reception by the intended receiver station.

SUMMARY OF THE INVENTION

According to the present invention in a data transmission system including a plurality of transmitter/receiver stations utilising a common transmission medium for the transmission of data signals in the form of data packets or groups of packets from a first station of the system to one or more other stations of the system, together with a digital checking signal value which is derived at least in part in a predetermined manner from the transmitted data signals and which is derivable in like manner at said one or more other stations from received data signals, wherein said digital checking signal value is arranged to be pre-loaded with a predetermined, or netkey, value at the transmitting station whereby only said one or more other stations of the system for which a packet or group of packets is or are intended, and which is or are provided with the predetermined or netkey value, is or are arranged to receive the packet or group of packets.

BRIEF DESCRIPTION OF THE DRAWINGS

A data transmission system in accordance with the present invention will now be described by way of example with reference to the accompanying drawing, of which.

DETAILED DESCRIPTION OF THE PREFERRED EMBODIMENTS

Figure 1:
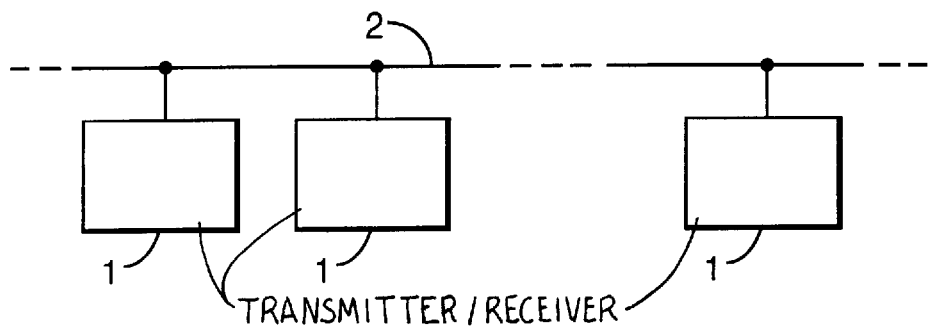
FIG. 1 shows a transmission system schematically.

Referring to the drawing, FIG. 1 shows schematically a data transmission system in which a plurality of transmitter/receiver stations 1 are linked by a common transmission medium 2, which medium is indicated as a transmission line but could equally be a spread spectrum frequency hopping radio transmission link.

Figure 2:
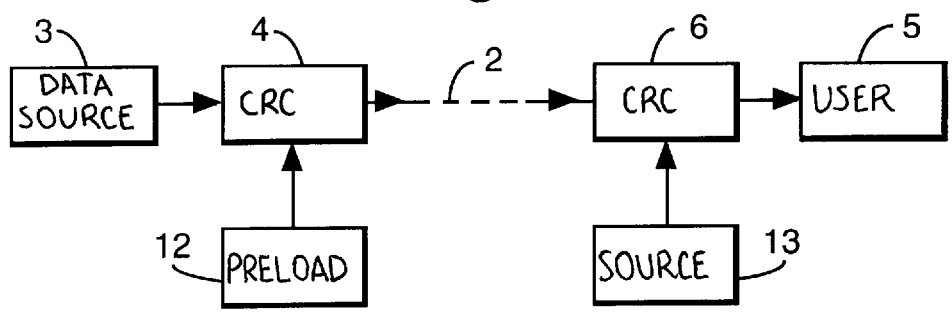
FIG. 2 shows schematically a system in accordance with the invention.

At each station 1 of the present system, as indicated in FIG. 2, a data stream from a source 3 passes to the transmission medium 2 by way of a cyclic redundancy checksum arrangement 4, while signals received over the transmission medium 2 are passed to user circuits 5 by way of a similar cyclic redundancy checksum arrangement 6.

Figure 3:
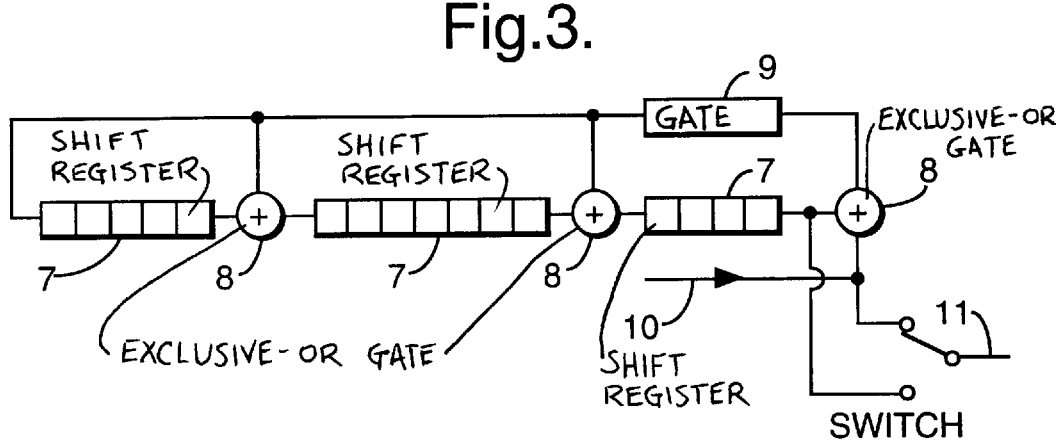
FIG. 3 shows part of the system of FIG. 2 in greater detail.

The arrangements 4 and 6 may each be of the form shown in FIG. 3, comprising shift register stages 7 interspersed with exclusive OR gates 8 to which digit values may be fed back by way of a gate circuit 9. Such an arrangement is described for example in the publication "Spread Spectrum Scene—First Anniversary Issue", dated April 1993, pages 12 and 13. In that publication the first step of the checksum algorithm is given as "clear the shift register", after which the data signals from the source 3 are simultaneously entered by way of the input 10 and transmitted by way of the input 11, the checksum digits following each block of data in transmission.

In the present arrangement, before each block of data is transmitted a predetermined set of bit values, say four bytes in length, is entered at input 10 from a preloading source 12, effectively presetting the checksum arrangement rather than clearing it, and altering the checksum value in a manner which will only properly be decoded at a receiving station which has available the corresponding predetermined set of bit values from a corresponding source 13.

It will be appreciated that the cyclic redundancy checksum value may be preloaded in other ways, for example by entering predetermined bit values directly into the stages 7 of the shift register at the start of the algorithm.

We claim:

1. A data transmission system comprising a plurality of transmitter/receiver stations utilizing a common transmission medium for the transmission of data signals between a first station of the system and other stations of the system in the form of data packets, with each data packet including digital data signals and a digital checking signal value derived in a predetermined manner from said digital data signals to enable checking at a receiver station for correct reception, a) said first station of the system comprising:
      i) means for deriving in said predetermined manner from data signals to be transmitted from said first station a first digital checking signal value, and
      ii) means for preloading said first digital checking signal value with a predetermined netkey value associated with a respective other station of the system in respect of a data packet intended for only said respective other station; and
   b) each said other station of the system comprising:
      i) means for deriving in a like predetermined manner from data signals received over said common transmission medium from said first station a second signal digital checking signal value, and ii) comparison means for comparing said second digital checking value with said first digital checking signal value as received, said comparison means at said respective other station with which said predetermined netkey value is associated being responsive to a first digital checking signal value that has been preloaded with said predetermined netkey value to indicate correct reception of said data signals.

2. The data transmission system in accordance with claim 1, wherein said means for deriving said first and second digital checking signal values comprise first and second cyclic redundancy checksum means; and wherein said means for preloading said first digital checking signal value comprises means for entering into said first cyclic redundancy checksum means, in addition to said data signals to be transmitted, a predetermined sequence of bit values representing said predetermined netkey value.

3. The data transmission system in accordance with claim 2, wherein said entering means is operative for entering said predetermined sequence of bit values into said first cyclic redundancy checksum means prior to entry of bit values from a respective data packet of the data signals.

4. A data transmission system comprising a plurality of transmitter/receiver stations utilizing a common transmission medium for the transmission of data signals between a first station of the system and other stations of the system in the form of data packets, with each data packet including digital data signals and a digital checking signal value derived in a predetermined manner from said digital data signals to enable checking at a receiver station for correct reception, a) said first station of the system comprising:
   i) means for deriving in said predetermined manner from data signals to be transmitted from said first station a first digital checking signal value, and
   ii) means for preloading said first digital checking signal value with a predetermined netkey value associated with a respective other station of the system in respect of a data packet intended for only said respective other station; and b) each said other station of the system comprising:
   i) means for deriving in a like predetermined manner from data signals received over said common transmission medium from said first station a second signal digital checking signal value, and
   ii) decoding means for comparing said second digital checking value with said first digital checking signal value as received, to indicate that said other station is a station intended to receive the transmitted data signals and that the transmitted data signals have been correctly received.

5. The data transmission system in accordance with claim 4, wherein said means for deriving said first and second digital checking signal values comprise first and second cyclic redundancy checksum means; and wherein said means for preloading said first digital checking signal value comprises means for entering into said first cyclic redundancy checksum means, in addition to said data signals to be transmitted, a predetermined sequence of bit values representing said predetermined netkey value.

6. The data transmission system in accordance with claim 5, wherein said entering means is operative for entering said predetermined sequence of bit values into said first cyclic redundancy checksum means prior to entry of bit values from a respective data packet of the data signals.

* * * * *